Dec. 5, 1967    K. J. CLEEREMAN    3,356,242
MULTI-LAYERED, THERMOPLASTIC ARTICLE
Filed Dec. 23, 1963

Kenneth J. Cleereman
INVENTOR.

BY Dominik, Stein + Knechtel
ATTORNEYS

United States Patent Office 3,356,242
Patented Dec. 5, 1967

3,356,242
MULTI-LAYERED, THERMOPLASTIC ARTICLE
Kenneth J. Cleereman, Midland, Mich., assignor to The Dow Chemical Company, Midland, Mich., a corporation of Delaware
Filed Dec. 23, 1963, Ser. No. 332,862
1 Claim. (Cl. 215—1)

This invention relates to a novel injection molding technique and to products produced therefrom. More particularly, this invention relates to the injection molding of products of rotational symmetry wherein multi-directional orientation is automatically imparted to the plastic material used to mold the product and fill spot weaknesses are automatically eliminated. This disclosure is a continuation-in-part of application Ser. No. 318,745 filed Oct. 24, 1963, now Patent Number 3,307,726.

Normally, when an article such as a cup is injection molded, molten plastic is usually injected through a gate into the center of the cavity (the fill spot) which defines the bottom of the cup. The direction of flow is toward the outer walls of the cup into a relatively cold mold. The sudden chilling of such unidirectional flow causes unidirectional orientation of the plastic molecules, especially at or near the fill spot and there is mechanical weakness in the transverse direction of the molded product.

However, because injection molding is very economical for forming articles such as cups of lowcost general purpose plastics, such as polystyrene, it has become very popular as a plastic forming means. In the past, the trade has disregarded or ignored many of the valuable mechanical properties of general purpose plastics. For example, general purpose polystyrene has a very high modulus of elasticity. It is available crystal clear and is easy to fabricate. It is also relatively low in cost. Yet, relatively few uses of this popular plastic utilize these highly desirable characterstics probably because they are too difficult to attain with the forming methods currently used. If such plastic could be injection molded with high controlled multi-directional orientation, many new products could be made with highly useful characteristics.

Some attempts have been made to obtain multi-directional orientation in cups, but unfortunately, they have not been successful. For example, U.S. 2,372,177 issued March 27, 1945, claims that certain plastic material may be formed into relatively thin walled cups with an effective grain direction extending helically thereof on the inner surface and longitudinally thereof on the outer surface. This is allegedly accomplished by a technique wherein, during injection molding, one part is moved relative to the other by a mechanical gear train. Movement of the mold part is tied to movement of the injecting piston.

Unfortunately, in actual practice, cups produced using the method described, do not possess the alleged degree of multi-directional strength. They still crack or splinter or break easily along a line either parallel to the axis of the article or in a hoop direction. Furthermore, the fill spot is extremely weak. To applicant's knowledge, the technique has never been adopted by the trade, probably due to the fact that no one could succesfully produce a cup having the alleged multi-directional strength.

One object of this invention is to provide a novel injection molding process.

Another object is to provide an injection molding process which automatically manufactures rotational symmetric products uniquely possessing high multi-directional strength.

Another object is to provide an injection molding process wherein fill spot weakness is substantially eliminated.

A further object is to provide apparatus which is capable of automatic injection molding of plastic products of rotational symmetry with a high multi-directional orientation.

A still further object is to provide injection molding apparatus, of the above character, which is capable of high speed, economical operation.

Another object is to provide injection molding apparatus which avoids fill spot weakness in the molded article.

Another object is to provide plastic products of rotational symmetry having high strength in all directions, including the fill spot.

Another object is to provide molded plastic products which have a unique laminar structure.

Another object is to provided molded plastic products of rotational symmetry wherein the molecular pattern is uniquely helicoidal through the thickness of the wall.

Another object is to provide plastic products of rotational symmetry which, by reason of their multiply structure oriented in different directions, resist puncturing, cracking, chipping, tearing and the like.

Other objects of the invention will in part be obvious and will in part appear hereinafter.

The invention accordingly comprises the several steps and the relation of one or more of such steps with respect to each of the others, and the product which possesses the characteristics and properties, all as exemplified in the detailed disclosure hereinafter set forth, and the scope of the invention will be indicated in the claim.

It has now been found that plastic articles of rotational symmetry with high multi-directional orientation and without fill spot weakness can be formed by the well-known injection molding technique if the mold cavity is filled at a spot off-center with respect to the axis of said article and while one of the mold elements is rotated with a level of torque at least equal to the static torque level of the mold equipment and the particular plastic raw material being used. Torque must be applied not only while the liquid plastic is being injected into the mold cavity, but also while it is solidifying to its second order transition point. With such an arrangement, a point will be reached during the molding cycle whereby the plastic will acquire sufficient resistance to the applied torque that it will cause the rotating mold element to stall. Thus there is application of torque until the orientation imparted to the molecules is "frozen in." Also, because of the off-center filling, the rotation "wipes out" the weakness of the fill spot and also imparts an orientation to the plastic at that spot.

More particularly, it has been found that when hollow plastic articles, all or a portion of which have rotational symmetry, are injection molded using a fill spot which is off-center with respect to the axis of the article while one of the mold elements forming said rotational symmetric portion is rotated with a torque of a level which permits continued rotation after the mold cavity is filled, but is insufficient to overcome the resistant forces generated by the thermoplastic when it reaches its second order transition point (the point of solidification), the molecules of the article including the fill spot will attain a high degree of multi-directional orientation in a layer-like helicoidal pattern of molecular thickness through the wall of said article. Such application of torque freezes orientation into the article so that it will thereafter possess multi-directional strength. To define said torque level in another way, the torque should be sufficient to cause continued rotation of the rotatable element for a short time after the mold is filled, but insufficient to damage or prevent solidification of the molded article.

For a fuller understanding of the nature and objects of the invention, reference should be had to the following detailed description taken in connection with the accompanying drawing, in which.

Similar reference characters refer to similar parts throughout the several views of the drawing.

Figure 1:
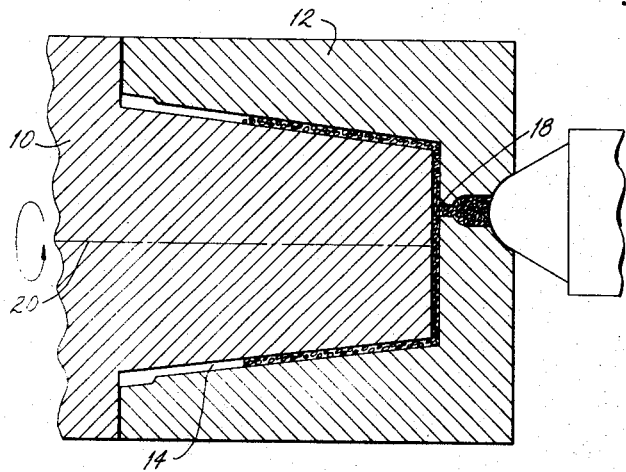
FIG. 1 is a cross-sectional view of injection mold apparatus illustrating the off-center filling of the mold cavity.
Figure 2:
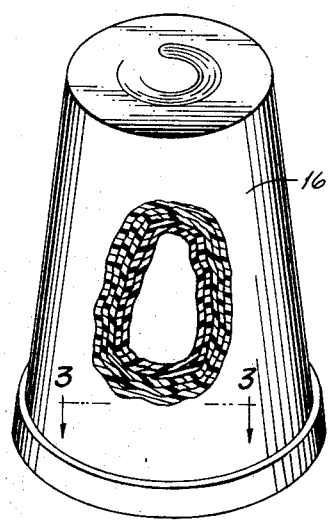
FIG. 2 is a broken perspective view of a cup molded in the apparatus of FIG. 1.

As seen in FIG. 1, that portion of the injection mold apparatus which is described in detail in the parent application, Ser. No. 318,745, filed Oct. 24, 1963, and which is pertinent to this invention, comprises a male die 10 and a female block 12, between which an injection mold cavity 14 is provided. The cavity is shaped to form a cup 16, such as seen in FIG. 2.

The cavity 14 is filled with thermoplastic via inlet 18, which is off-center with respect to the axis 20 of the rotationally symmetric cup being molded.

As discussed and described in detail in the parent application Ser. No. 318,745 filed Oct. 24, 1963, the rotation of the mold element is preferably accomplished, by rotating one member of the mold with a rotational means, wherein a certain preset level of torque is applied to the plastic as it flows into the mold cavity and solidifies. The level of torque applied depends upon the raw thermoplastic material used, the shape being molded, the surface characteristics of the mold, the machine utilized, and similar factors. Optimally, the level should be that of static torque which may be defined as the minimum torque needed to lock or stall the rotating mold element when the thermoplastic reaches its second order transition point.

One preferred torque applying means for the rotatable element of the mold is a presettable constant torque motor. It is capable of rotating the male member until the cooling thermoplastic article sets up sufficient resistant force to cause stalling. However, the preset torque of said motor continues to act upon the mold element until the plastic solidifies. At this stage, the plastic is at its second order transition point.

The continued application of torques "freezes" in the orientation which was imparted to the molecules of said plastic during its injection into the mold cavity. Furthermore, the molecules in the fill spot area which is off-center also are oriented. Then the application of the actuating force is terminated.

In essence, the process causes orientation by creating a condition wherein molecular flow is retarded while an elastic strain is placed upon the molecules. By freezing in this elastic strain due to cooling of the plastic, an oriented structure without fill spot weakness is uniquely achieved. Heretofore, such freezing in of elastic strain during cooling and wiping out of the fill spot by positioning it off-center has been overlooked and this is probably the reason prior art teachings were inoperable.

The article molded as described above possesses a high degree of multi-directional orientation and has good flexibility in all directions, good crush strength, and is puncture resistant. There is also no fill spot weakness.

Figure 3:
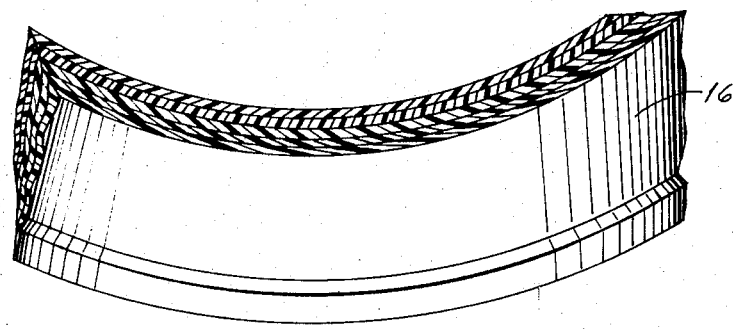
FIG. 3 is a highly detailed cross-sectional view of the cup wall.

An examination of samples will reveal that the orientation is not biaxial. It is more fan-shape throughout the thickness of the article (see FIG. 3). At the midpoint of the cross-sectional thickness, the orientation is mainly in the hoop direction; at one surface, the orientation is about $+45°$ while at the other surface it is about $-45°$. There is no fill spot (see FIG. 2) because it has been wiped over by the rotating mold element. The result is a very strong semi-laminated structure having increased toughness. When a destructive force is applied even at the fill spot, a multi-laminated breaking occurs; and it becomes readily evident that the article has a plural ply structure.

It will thus be seen that the objects set forth above, among those made apparent from the preceding description, are efficiently attained, and since certain changes may be made in carrying out the above process, in the described product, and in the constructions set forth without departing from the scope of the invention, it is intended that all matter contained in the above description shall be interpreted as illustrative and not in a limiting sense.

It is also to be understood that the following claim is intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

A thermoplastic article having rotational symmetry and a multi-layered structure and lacking the customary fill-spot weakness, each layer of said multi-layered structure having a molecular orientation different than the orientation in an adjacent layer thereto, whereby multi-directional strength is imparted to said article, comprising an injection molded structure, its fill spot being off-center with respect to its axis, wherein the superimposed composite orientation curve for a plurality of layers spaced equidistantly across the thickness of the structure of said article evidences, when overstressed, a grain structure which runs in different directions than the direction of flow.

References Cited
UNITED STATES PATENTS

| | | | |
|---|---|---|---|
| 1,901,559 | 3/1933 | Humphreys | 161—36 |
| 2,372,177 | 3/1945 | Conner | 264—328 X |
| 2,506,915 | 5/1950 | Bishop | 161—36 |
| 3,030,668 | 4/1962 | Taylor | 264—311 |
| 3,092,440 | 6/1963 | Rex | 264—328 |
| 3,131,432 | 5/1964 | Battell | 18—30 |
| 3,141,197 | 7/1964 | Hann | 18—30 |
| 3,159,701 | 12/1964 | Herter | 264—328 |

JOSEPH R. LECLAIR, *Primary Examiner.*

ROBERT F. WHITE, *Examiner.*

R. B. MOFFITT, D. F. NORTON, *Assistant Examiners.*